Nov. 19, 1935.     W. ERNST     2,021,354
EXTERNAL ADJUSTMENT FOR HYDRAULIC PUMP BEARINGS
Filed Aug. 16, 1934
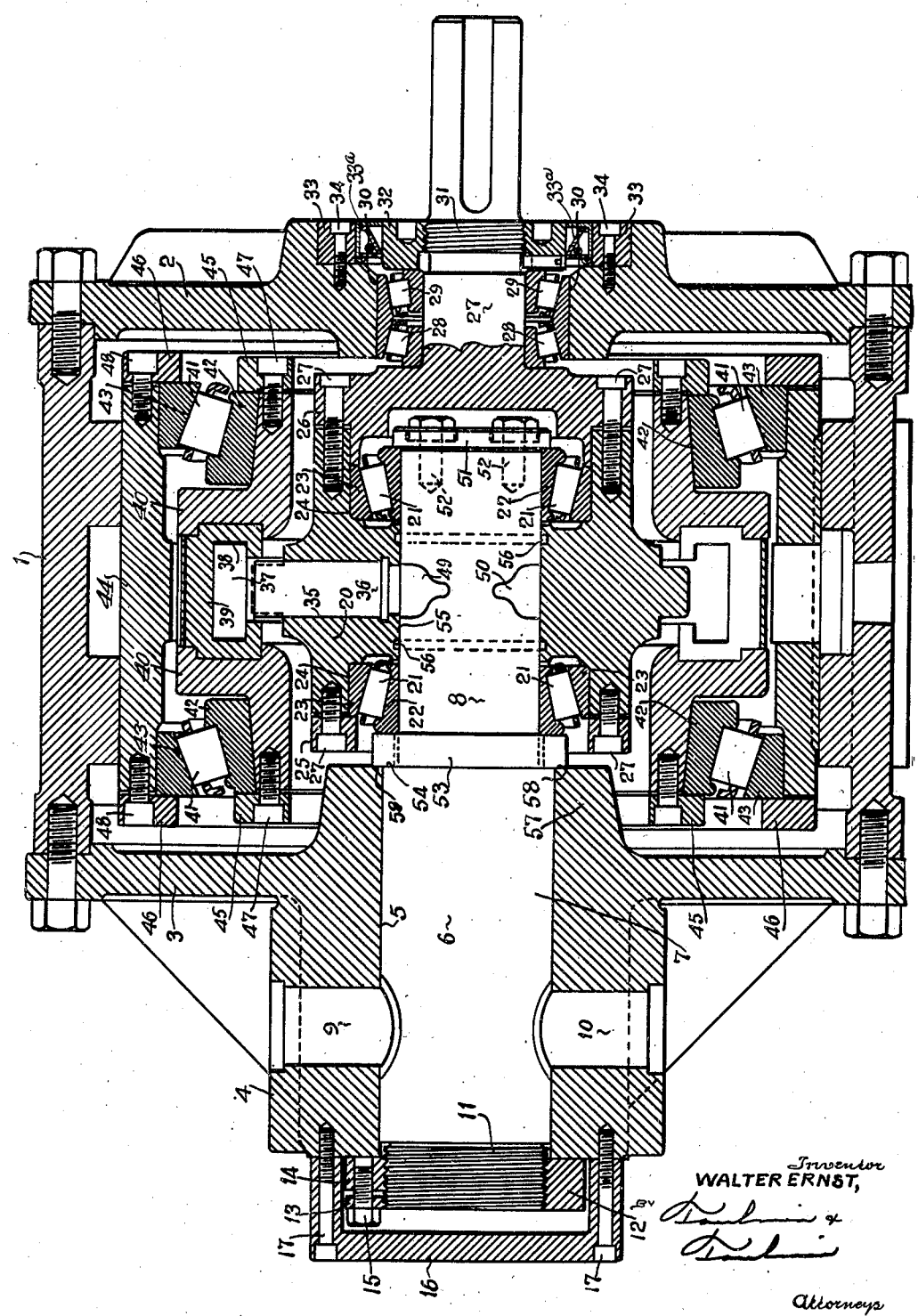
Inventor
WALTER ERNST,
Attorneys Patented Nov. 19, 1935

2,021,354

UNITED STATES PATENT OFFICE 2,021,354

EXTERNAL ADJUSTMENT FOR HYDRAULIC PUMP BEARINGS

Walter Ernst, Mount Gilead, Ohio, assignor to The Hydraulic Press Manufacturing Company, Mount Gilead, Ohio, a corporation of Ohio Application August 16, 1934, Serial No. 740,138

9 Claims. (Cl. 103—161)

This invention relates to hydraulic pumps or motors and, in particular, to the adjustment of the bearings on such pumps or motors as are rotatably supported upon pintles.

One object of my invention is to provide an adjustment for taking up the "play" in the bearings of a hydraulic pump or motor, this adjustment being effected at a point outside the motor.

Another object is to provide an external adjustment device for the tapered roller bearings upon which the cylinder barrel of a hydraulic pump or motor is rotatably supported with respect to the pintle.

Another object is to provide an adjustment for the tapered roller bearings upon which the cylinder barrel of such a pump or motor is rotatably supported, this adjustment being effected by moving the external end of the pintle around which the cylinder barrel rotates.

Another object is to provide such an adjustment wherein the motion of the pintle is effected by means of micrometer screw action, enabling the looseness of the bearings to be adjusted to a very accurate degree.

Another object is to provide locking means for locking the pintle and the bearings in their adjusted positions.

In the drawing:

The figure is a central vertical section through a hydraulic pump or motor containing the bearing adjustment device of my invention.

Referring to the drawing in detail, the figure shows a hydraulic pump or motor of the rotary type, and having a cylindrical casing 1 provided with end plates 2 and 3. The end plate 3 is provided with a boss 4 having a bore 5 adapted to receive the large end 6 of a pintle 7, upon the smaller end 8 of which the moving parts of the pump rotate. Boss 4 is also provided with ports 9 and 10 to provide inlet and outlet passages for the fluid utilized by the pump or motor. The large portion 6 of the pintle or fluid distributing valve 7 is slidably mounted in the bore 5, and is provided with a threaded portion 11 at its outer end. This threaded portion 11 is engaged by the threaded nut 12 having the slit locking portions 13 and 14 which are forced toward or away from one another by means of the locking screw 15 threaded therethrough. These parts are protected by the end cap 16 held against the boss 4 by the screws 17.

On the pintle portion 8 the cylinder barrel 20 is rotatably supported, through the intermediate agency of the tapered roller bearings 21 having their inner races 22 mounted upon the pintle portion 8. The outer races 23 thereof are mounted in bores 24 in the cylinder barrel, and are held in place by the retaining members 25 and 26 respectively. The retaining ring 25 is held in place by the screws 27, whereas the retaining portion 26 is similarly attached to the cylinder barrel by means of the screws 27.

The retaining portion 26 is provided with a drive shaft portion 27 which is supported by the anti-friction bearings 28 and 29 to enable it to be rotatably mounted in the bore 30 of the end plate 2. The drive shaft portion 27 is provided with threads 31 which are engaged by the threaded lock ring 32. Secured to the pump casing end plate 2 is the retaining ring 33, held in place by its screws 34. Between the retaining ring 33 and the threaded lock ring 32, and secured by a pressed fit in the former, is the oil seal ring 33a. The latter serves to prevent the leakage of oil from the interior of the pump by way of the bearings 28—29.

The cylinder barrel 20 is provided with radial cylinder bores 35, within which the pistons 36 are reciprocably mounted. These are provided with cross heads 37 adapted to reciprocate tangentially in the slots 38 of the guide blocks 39. The latter are clamped between the secondary rotor halves 40, these rotor halves being rotatably supported upon the tapered roller bearings 41, the inner races 42 of which are mounted upon the secondary rotor halves 40 themselves, whereas the outer races 43 are supported in the shifter ring 44. The races 42 and 43 are held in position by the retaining rings 45 and 46 respectively, through the agency of the screws 47 and 48. The shifter ring 44 is provided with means for shifting it to and fro, thereby varying the axis of rotation of the secondary rotor halves 40 with reference to the axis of rotation of the cylinder barrel 20. This eccentricity of axes causes the pistons 36 to reciprocate in the cylinder bores 35, in a manner well understood by those skilled in the art. The pintle 7 is provided with longitudinal bores (not shown), forming means of communication between the external ports 9 and 10 and the pintle cut-outs 49 and 50 respectively. Accordingly, fluid is conveyed to and from the cylinder bores 35 by means of these cut-outs, bores and ports.

The pintle portion 8 is provided at its free end with a retaining plate 51, this being bolted to the end of the pintle by means of the cap screws 52. In this manner the inner race 22 of the righthand tapered roller bearing is held securely in position. The inner race 22 of the lefthand tapered roller bearing abuts the ring 53 loosely mounted on the pintle portion 8. The ring 53 abuts the shoulder 54 between the pintle portions 6 and 8 as well as the inner surface 57 of the inwardly-projecting portion 58 of the end plate 3. The bore 55 in the cylinder barrel 20 is made of such dimensions relative to the outside dimensions of the pintle portion 8 that a very slight clearance exists between them. The annular passages 56 are provided for the relief of the fluid escaping from the cylinder bores 35 or pintle cutouts 49 and 50, and to prevent an unequal moment of forces tending to warp the pintle.

In the operation of my invention, the tapered roller bearings 21 are adjusted by removing the cap 16 by taking out the screws 17. The lock screw 15 is then loosened, permitting the adjusting nut 12 to be turned.

If the bearings 21 are unnecessarily loose, and it is desired to tighten them, the lock nut 12 is turned in a clockwise direction so that the pintle 7 is drawn to the left. This action causes the retaining plate 51 to push the tapered inner race 22 of the righthand tapered roller bearing 21 inward; and the inner race 22 is prevented from moving inward by the ring 53 abutting the inner face 58 of the end plate 3. Consequently, this results in the tapered roller bearings 21 being tightened by reason of their tapered races 22 and 23 being forced toward one another. The bearings may be tightened until they bind slightly or until they reach the necessary amount of tightness, after which the adjusting nut 12 is locked in position by turning the lock screw 15.

By reversing the direction of rotation of the lock nut 12, it is obviously possible to loosen the bearings if they happen to be too tight in their adjustment. It will be observed that the operation of tightening or loosening the bearings can be conducted without dismantling the pump or motor, and accordingly the cylinder barrel 20 may be made to rotate relative to the pintle portion 8 with as little lost motion therebetween as may be desired.

It will be understood that I desire to comprehend within my invention such modifications as may be necessary to adapt it to varying conditions and uses.

Having thus fully described my invention, what I claim as new and desire to secure by Letters Patent is:

1. A fluid pressure pump or motor including a casing forming a chamber, a cylinder body within the chamber having cylinders with pistons reciprocable therein, means for reciprocating said pistons, an axially movable fluid distributing valve, said cylinder body and said fluid distributing valve being mounted for rotation relatively to one another, adjustable anti-friction bearing assemblies mounted between said cylinder body and said fluid distributing valve, means responsive to the axial motion of said fluid distributing valve to adjust the diametral clearances of said bearing assemblies, a portion of said fluid distributing valve extending outside said chamber, and means on said external portion for axially moving said fluid distributing valve to adjust said diametral clearances.

2. A fluid pressure pump or motor including a casing forming a chamber, a cylinder body within the chamber having cylinders with pistons reciprocatable therein, means for reciprocating said pistons, an axially movable fluid distributing valve, said cylinder body and said fluid distributing valve being mounted for rotation relatively to one another, adjustable anti-friction bearing assemblies mounted between said cylinder body and said fluid distributing valve, means responsive to the axial motion of said fluid distributing valve to adjust the diametral clearances of said bearing assemblies, said adjusting means comprising a contacting portion on said fluid distributing valve arranged to engage one of said bearing assemblies and a stationary member cooperating therewith to engage the other bearing assembly so as to urge said bearing assemblies toward one another in response to the axial motion of said fluid distributing valve, a portion of said fluid distributing valve extending outside said chamber, and means on said external portion for axially moving said fluid distributing valve to adjust said diametral clearances.

3. A fluid pressure pump or motor including a casing forming a chamber, a cylinder body within the chamber having cylinders with pistons reciprocable therein, a secondary rotor mounted for rotation upon an axis independent of said cylinder body and arranged to engage said pistons to impart reciprocation thereto, an axially movable fluid distributing valve, said cylinder body and said fluid distributing valve being mounted for rotation relatively to one another, adjustable antifriction bearing assemblies mounted between said cylinder body and said fluid distributing valve, means responsive to the axial motion of said fluid distributing valve to adjust the diametral clearances of said bearing assemblies, a portion of said fluid distributing valve extending outside said chamber, and means on said external portion for axially moving said fluid distributing valve to adjust said diametral clearances.

4. A fluid pressure pump or motor including a casing forming a chamber, a cylinder body within the chamber having cylinders with pistons reciprocable therein, means for reciprocating said pistons, an axially movable fluid distributing valve, said cylinder body and said fluid distributing valve being mounted for rotation relatively to one another, a pair of spaced antifriction bearing assemblies mounted between said cylinder body and said fluid distributing valve, each of said bearing assemblies having relatively movable races, means responsive to the axial motion of said fluid distributing valve to move said races relatively to one another to adjust the diametral clearances of said bearing assemblies, said fluid distributing valve extending outside said chamber, and means on said external portion for axially moving said fluid distributing valve to adjust said diametral clearances.

5. A fluid pressure pump or motor including a casing forming a chamber, a cylinder body within the chamber having cylinders with pistons reciprocable therein, means for reciprocating said pistons, an axially movable fluid distributing valve, said cylinder body and said fluid distributing valve being mounted for rotation relatively to one another, spaced tapered roller bearing assemblies mounted between said cylinder body and said fluid distributing valve, each of said bearing assemblies having relatively movable races, means responsive to the axial motion of said fluid distributing valve to move said races relatively to one another to adjust the diametral clearances of said bearing assemblies, a portion of said fluid distributing valve extending outside said chamber, and means on said external portion for axially moving said fluid distributing valve to adjust said diametral clearances.

6. A fluid pressure pump or motor including a casing forming a chamber, a cylinder body within the chamber having cylinders with pistons reciprocable therein, means for reciprocating said pistons, an axially movable fluid distributing valve, said cylinder body and said fluid distributing valve being mounted for rotation relatively to one another, a pair of spaced anti-friction bearing assemblies mounted between said cylinder body and said fluid distributing valve, each of said bearing assemblies having relatively movable races, means movable with said fluid distributing valve to engage a race of one of said bearing assemblies and a relatively stationary member arranged to cooperate with said movable means to engage a race of the other bearing assembly so as to urge said bearing assemblies toward one another in response to the axial motion of said fluid distributing valve to adjust the diametral clearances of said bearing assemblies, a portion of said fluid distributing valve extending outside said chamber, and means on said external portion for axially moving said fluid distributing valve to adjust said diametral clearances by moving said races.

7. A fluid pressure pump or motor including a casing forming a chamber, a cylinder body within the chamber having cylinders with pistons reciprocable therein, means for reciprocating said pistons, an axially movable fluid distributing valve, said cylinder body and said fluid distributing valve being mounted for rotation relatively to one another, spaced tapered roller bearing assemblies mounted between said cylinder body and said fluid distributing valve, each of said bearing assemblies having relatively movable races, means movable with said fluid distributing valve to engage a race of one of said bearing assemblies and a relatively stationary member arranged to cooperate with said movable means to engage a race of the other bearing assembly so as to urge the races of said bearing assemblies toward one another in response to the axial motion of said fluid distributing valve, a portion of said fluid distributing valve extending outside said chamber, and means on said external portion for axially moving said fluid distributing valve to adjust the diametral clearances of said tapered roller bearing assemblies.

8. A fluid pressure pump or motor including a casing forming a chamber, a cylinder body within the chamber having cylinders with pistons reciprocable therein, means for reciprocating said pistons, an axially movable fluid distributing valve, said cylinder body and said fluid distributing valve being mounted for rotation relatively to one another, a pair of spaced anti-friction bearing assemblies mounted between said cylinder body and said fluid distributing valve, each of said bearing assemblies having relatively movable races, a portion of said fluid distributing valve adapted to engage one race of one of said bearing assemblies, a loosely mounted member on said fluid distributing valve adapted to engage the corresponding race of the other bearing assembly, said fluid distributing valve extending outside said chamber, and means on said external portion for axially moving said fluid distributing valve to alter the spacing between said valve end portion and said loosely mounted member, whereby to adjust the diametral clearances of said bearing assemblies.

9. A fluid pressure pump or motor including a casing forming a chamber, a cylinder body within the chamber having cylinders with pistons reciprocable therein, means for reciprocating said pistons, an axially movable fluid distributing valve, said cylinder body and said fluid distributing valve being mounted for rotation relatively to one another, a pair of spaced anti-friction bearing assemblies mounted between said cylinder body and said fluid distributing valve, each of said bearing assemblies having relatively movable races, a projecting member on said fluid distributing valve adapted to engage one race of one of said bearing assemblies, a sliding ring on said fluid distributing valve adapted to engage said casing and the corresponding race of the other bearing assembly, a portion of said fluid distributing valve extending outside said chamber, and means on said external portion for axially moving said fluid distributing valve to alter the spacing between said projecting member and said sliding ring, whereby to adjust the diametral clearances of said bearing assemblies.

WALTER ERNST.